(12) United States Patent
Ellis

(10) Patent No.: US 7,478,856 B1
(45) Date of Patent: Jan. 20, 2009

(54) KIT FOR CONVERSION OF HORIZONTALLY HINGED DOOR OF RECREATIONAL VEHICLE TO A TABLE

(75) Inventor: Phillip Ellis, Kingston, TN (US)

(73) Assignee: Philmar, LLC, Kingston, TN (US)

( * ) Notice: Subject to any disclaimer, the term of this patent is extended or adjusted under 35 U.S.C. 154(b) by 0 days.

(21) Appl. No.: 11/774,389

(22) Filed: Jul. 6, 2007

(51) Int. Cl.
*B60R 5/00* (2006.01)
(52) U.S. Cl. ..................... 296/37.1; 396/37.6
(58) Field of Classification Search ............. 296/37.1, 296/146.5, 37.6, 146.9, 146.1
See application file for complete search history.

(56) References Cited

U.S. PATENT DOCUMENTS

| | | | | |
|---|---|---|---|---|
| 3,375,959 A | * | 4/1968 | Hamilton | 224/484 |
| 3,712,662 A | * | 1/1973 | Busby | 296/37.1 |
| 3,934,924 A | * | 1/1976 | Diliberti | 296/163 |
| 4,135,761 A | * | 1/1979 | Ward | 296/37.6 |
| 4,518,189 A | * | 5/1985 | Belt | 296/37.1 |
| 4,620,344 A | * | 11/1986 | Lewis, Jr. | 16/337 |
| 5,067,537 A | * | 11/1991 | Offner | 144/372 |
| 5,398,987 A | * | 3/1995 | Sturgis | 296/37.6 |
| 5,590,925 A | * | 1/1997 | Banks, Sr. | 296/24.45 |
| 5,743,584 A | * | 4/1998 | Lance et al. | 296/37.6 |
| 5,909,921 A | * | 6/1999 | Nesbeth | 296/37.6 |
| 6,059,341 A | * | 5/2000 | Jensen et al. | 296/37.1 |
| 6,793,270 B2 | * | 9/2004 | van der Vegt et al. | 296/37.1 |
| 6,921,492 B2 | * | 7/2005 | De Gaillard | 296/37.6 |
| 7,322,636 B1 | * | 1/2008 | Woodhouse et al. | 296/146.1 |
| 2008/0093811 A1 | * | 4/2008 | Williams | 290/35 |

* cited by examiner

*Primary Examiner*—Kiran B. Patel
(74) *Attorney, Agent, or Firm*—Pitts & Brittian, PC

(57) ABSTRACT

A kit for conversion of a horizontally hinged door of an external storage compartment of a recreation vehicle to a table, including first and second frame clamps adapted to be mounted in at least proximity to the bottom frame member of the storage compartment in spaced apart relationship to one another along the bottom frame member, first and second door plates adapted to be mounted to the inside surface of the door in spaced apart relationship to one another, first and second length-adjustable elongated stanchions, each having an inboard end and an outboard end, multiple removable fasteners adapted to temporarily secure the first ends of the elongated stanchions to respective ones of the first and second frame clamps, and the second ends of the elongated stanchions to respective ones of the door plates. In one embodiment there is provided carrier means adapted to receive a portion or all of the kit components for storage and handling.

3 Claims, 13 Drawing Sheets

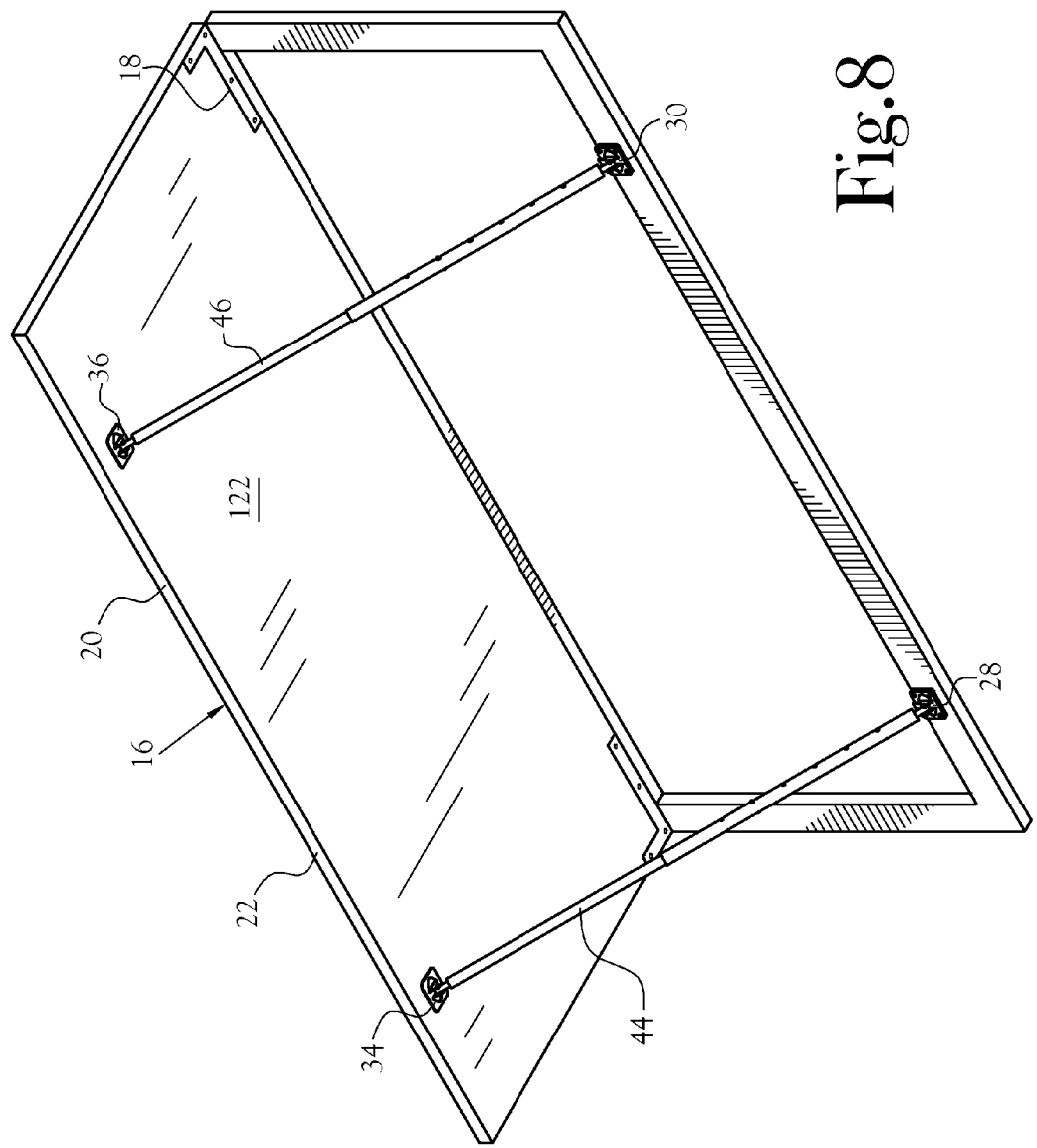

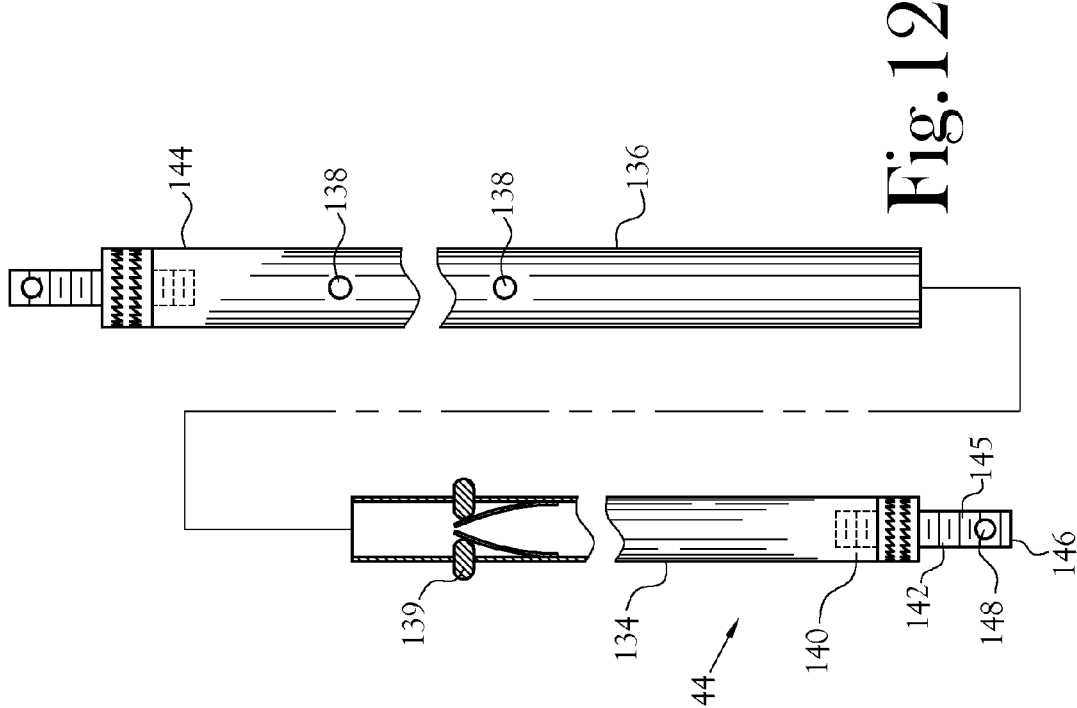
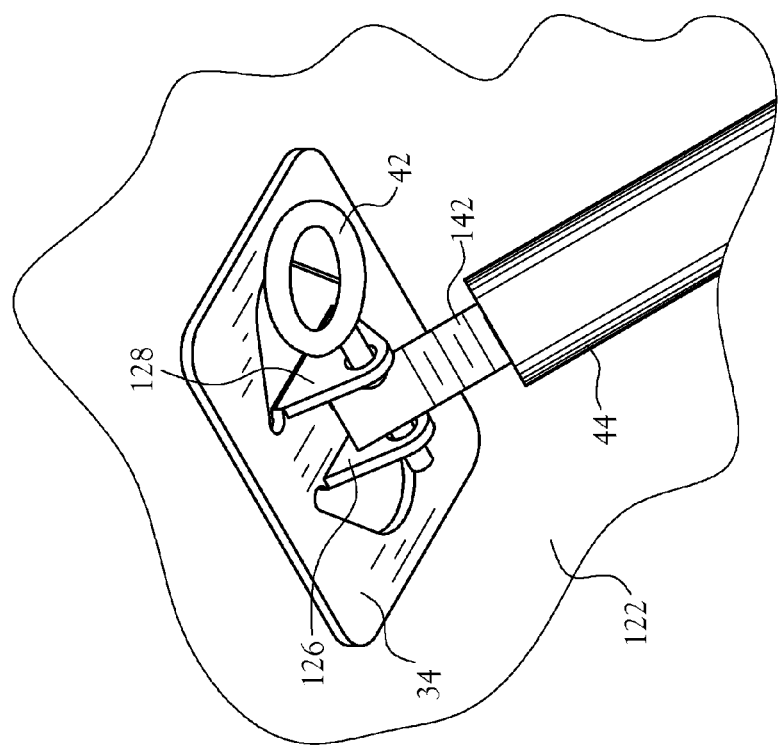

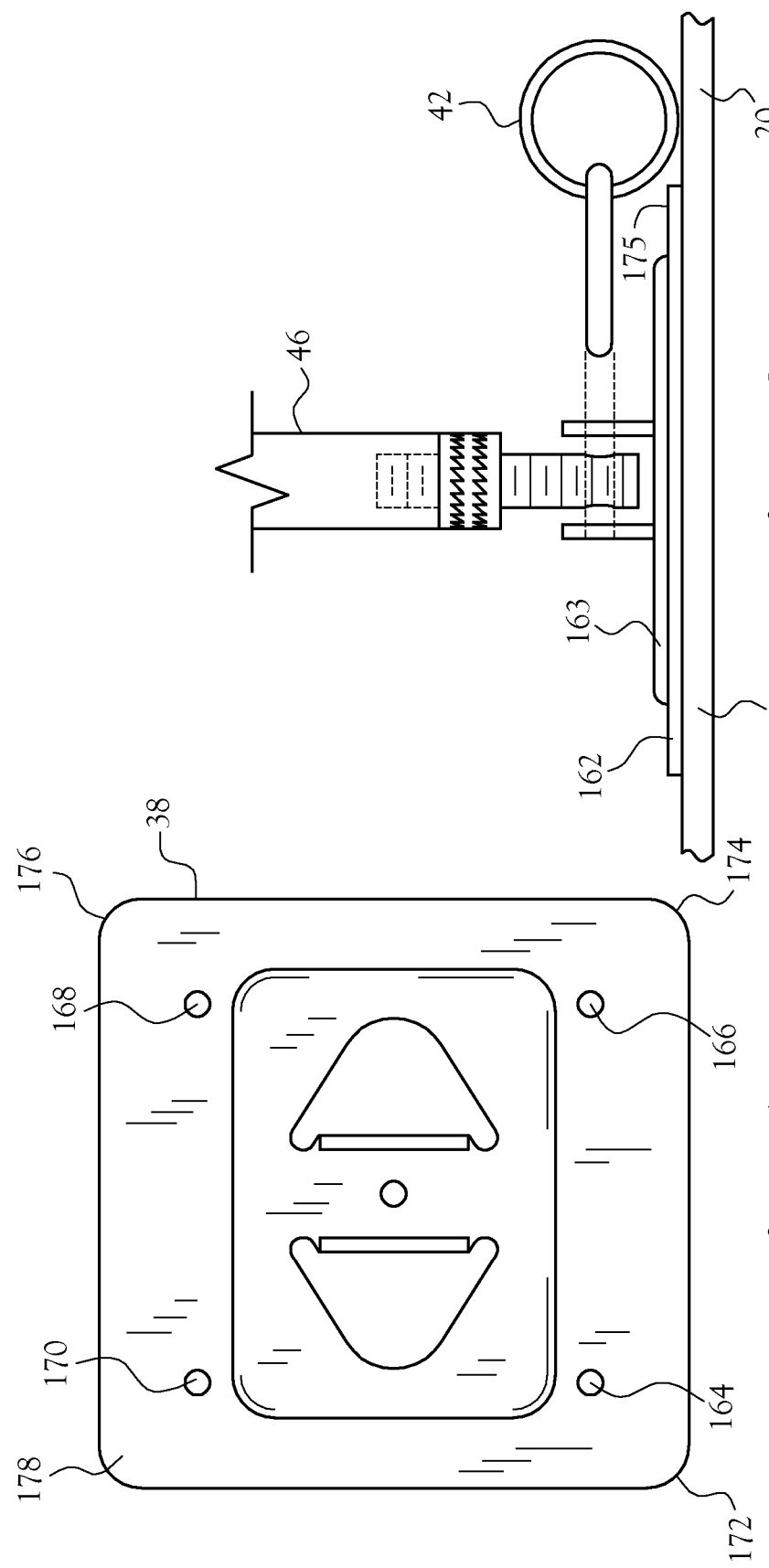

KIT FOR CONVERSION OF HORIZONTALLY HINGED DOOR OF RECREATIONAL VEHICLE TO A TABLE

CROSS-REFERENCE TO RELATED APPLICATIONS

Not Applicable

STATEMENT REGARDING FEDERALLY SPONSORED RESEARCH OR DEVELOPMENT

Not Applicable

FIELD OF INVENTION

This invention relates to recreation vehicles having externally accessible storage compartments which are closeable by means of a horizontally hinged door.

BACKGROUND OF INVENTION

Recreation vehicles commonly include storage compartments built into the framework of the vehicle such that the compartment is accessible from the outside of the vehicle. These compartments also commonly include a door which is closed for securing the contents of the compartment and which may be opened to provide access to the interior of the compartment. Many of these doors of existing recreation vehicles are hinged along a horizontal top edge of the door to the vehicle body structure. Such doors are opened by pulling the bottom edge of the door outwardly and upwardly about the axis of the horizontal hinge to provide access to the interior of the storage compartment. Maintaining the door open may be accomplished through the use of latches, pins, or other means for temporarily holding open the raised door. Heretofore, such doors have provided no benefit aside from their function of closing off access to the storage compartment with which the door is associated. This function being the primary function of the door has heretofore forestalled proposed uses of the door which are not associated with the opening and closing function of the door.

SUMMARY OF INVENTION

In accordance with one aspect of the present invention there is provided a kit for conversion of a horizontally hinged door of an external storage compartment of a recreation vehicle to a table, including first and second frame clamps adapted to be mounted to or proximate to, the bottom frame member of the storage compartment in spaced apart relationship to one another along the bottom frame member, first and second door plates adapted to be mounted to the inside surface of the door in spaced apart relationship to one another, first and second length-adjustable elongated stanchions, each having an inboard end and an outboard end, multiple removable fasteners adapted to temporarily secure the first ends of the elongated stanchions to respective ones of the first and second frame clamps, and the second ends of the elongated stanchions to respective ones of the door plates. In one embodiment there is provided carrier means adapted to receive a portion or all of the kit components for storage and handling.

BRIEF DESCRIPTION OF DRAWINGS

FIG. 8 is a representation of one embodiment of the present invention as installed on a horizontally hinged door on a recreation vehicle;

FIG. 11 is a representation of a door plate as depicted in FIG. 9 mounted on the innermost surface of a door for an external storage compartment;

FIG. 12 is an exploded representation of one embodiment of an adjustable positioning stanchion embodying various aspects of the present invention;

FIG. 17 is a representation of a lock cover plate embodying various aspects of the present invention;

FIG. 18 is a side plan view of the lock cover plate depicted in FIG. 17;

DETAILED DESCRIPTION OF INVENTION

Figure 1:
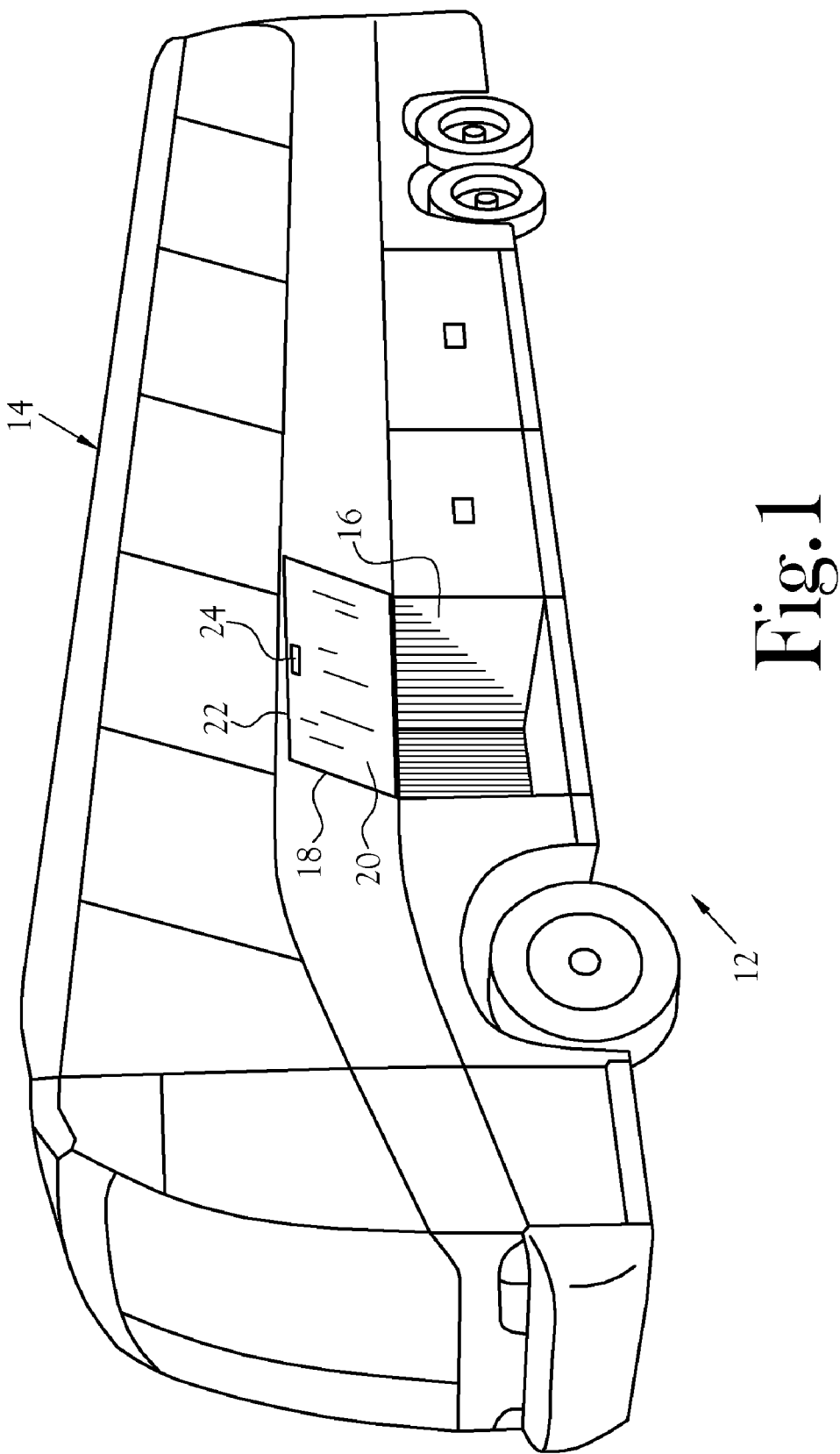
FIG. 1 is a representation of a recreation vehicle having an external storage compartment.

Referring initially to FIG. 1, there is depicted a portion 12 of a typical recreation vehicle 14 having an external storage compartment 16 which is closed by a horizontally hinged door 20. To open the door, one grasps the bottom edge 22 of the door (commonly provided with a handle 24), and pulls outwardly and upwardly to raise the door to its open position to provide access to the storage compartment. In Class A recreation vehicles, opening of the door may be hydraulically assisted, plus the door may include an electrically-operated lock.

Figure 2:
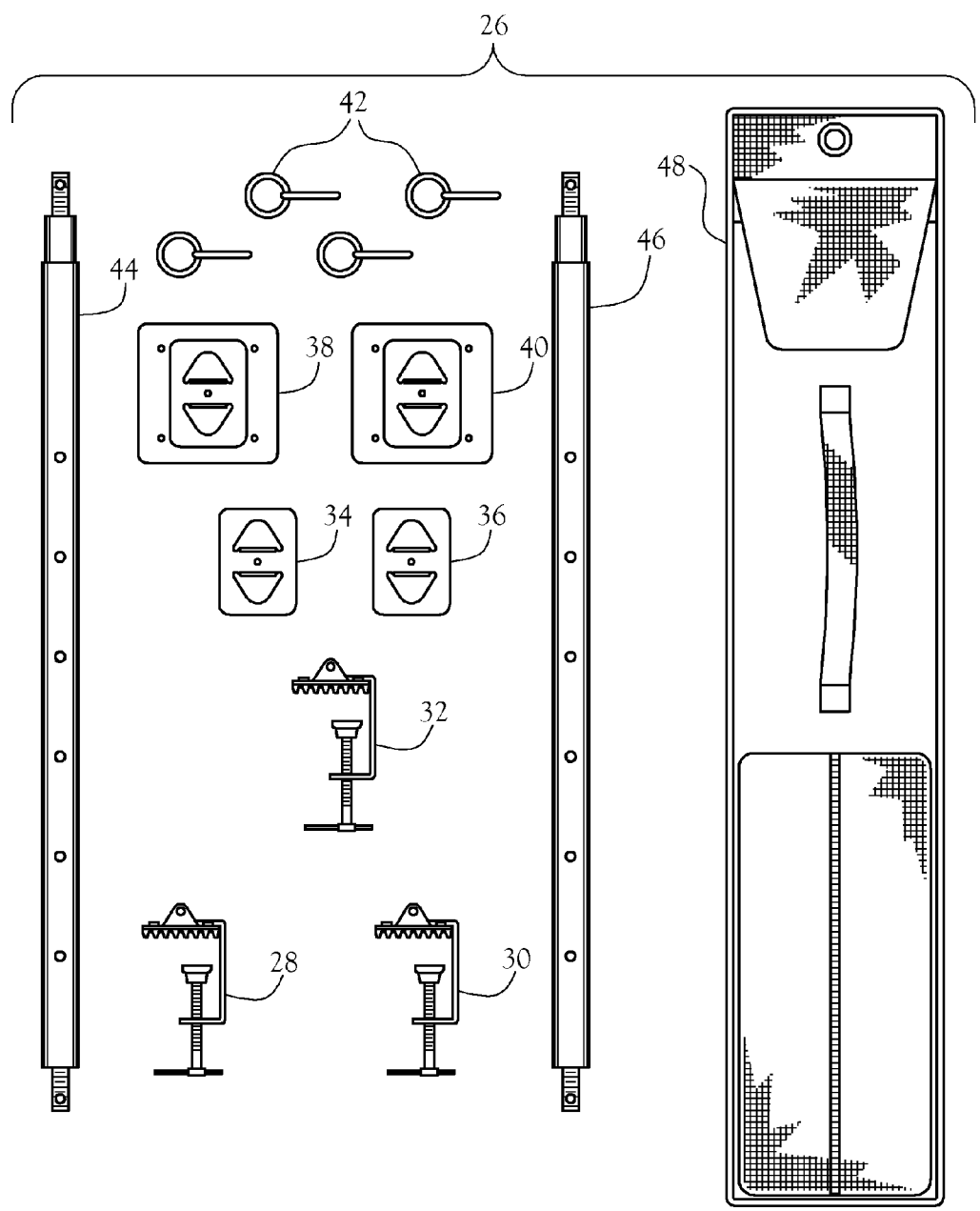
FIG. 2 is a "laid out" representation of one embodiment of a kit embodying various aspects of the present invention.

In accordance with one aspect of the present invention there is provided a kit 26 which is depicted in "laid out"

format in FIG. 2. The depicted kit comprises first and second frame clamps 28 and 30 respectively, a multiple-door clamp 32, first and second door plates 34 and 36, respectively, first and second lock cover plates 38 and 40, respectively, multiple quick release pins 42 (typical) and first and second stanchions 44 and 46, respectively, of adjustable length, and a bag 48 suitable for storage or transport of the various components of the kit. In the depicted embodiment, the first and second door frame clamps are essentially identical, the first and second door plates are essentially identical, the first and second door lock plates are essentially identical; the first and second stanchions are essentially identical; and the plurality of quick release pins 42 are essentially identical.

Figure 3:
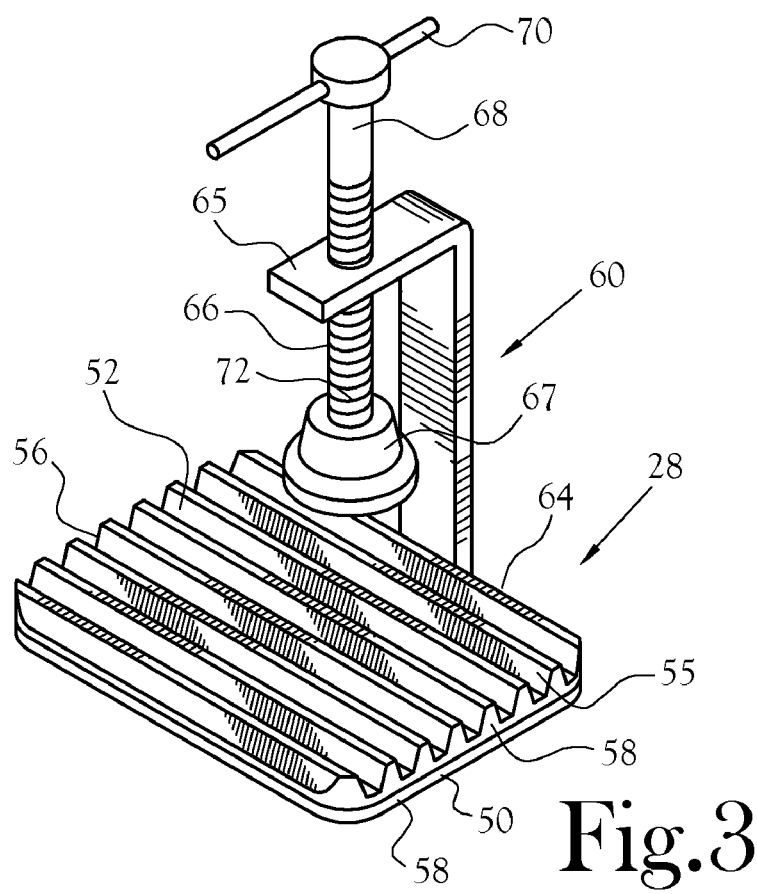
FIG. 3 is a representation of one embodiment of a door frame clamp component of the present invention.

As seen in FIG. 3, each door frame clamp includes a substantially rectangular planar body portion 50 having a first inside planar surface 52 and an outer second opposite substantially planar surface 54. On the first surface 52 of the door frame clamp there is provided a plurality of resilient, non-slip, ribs 55 (typical) on which extend parallel to one another between the opposite ends 56, 58 of the body portion. The door frame clamp further includes a mounting bracket 60 having a first end 62 thereof fixedly attached to the outer surface 54 of the body portion of the clamp. This bracket extends above the body portion and includes an outboard end 65 which overhangs the inner surface 52 of the body portion of the clamp and which threadably receives therethrough an externally threaded cap screw 66. This cap screw includes an outboard end 68 having an elongated handle 70 or similar element adapted to permit adjustment of the threaded screw member within the outboard end of the bracket.

Figure 7:
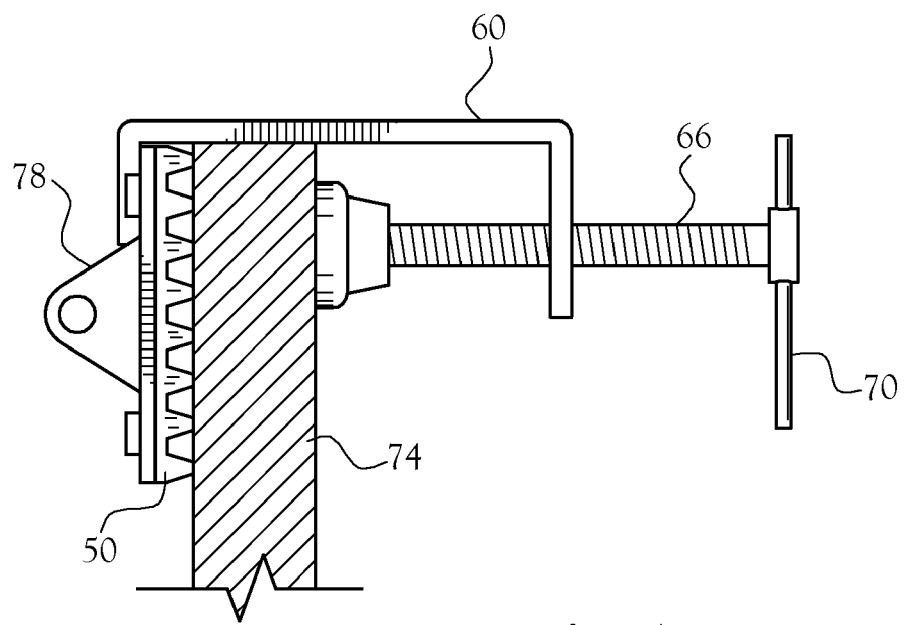
FIG. 7 is a sectional view of a door frame clamp of the present invention as deployed on a door frame of a recreation vehicle.
Figure 6:
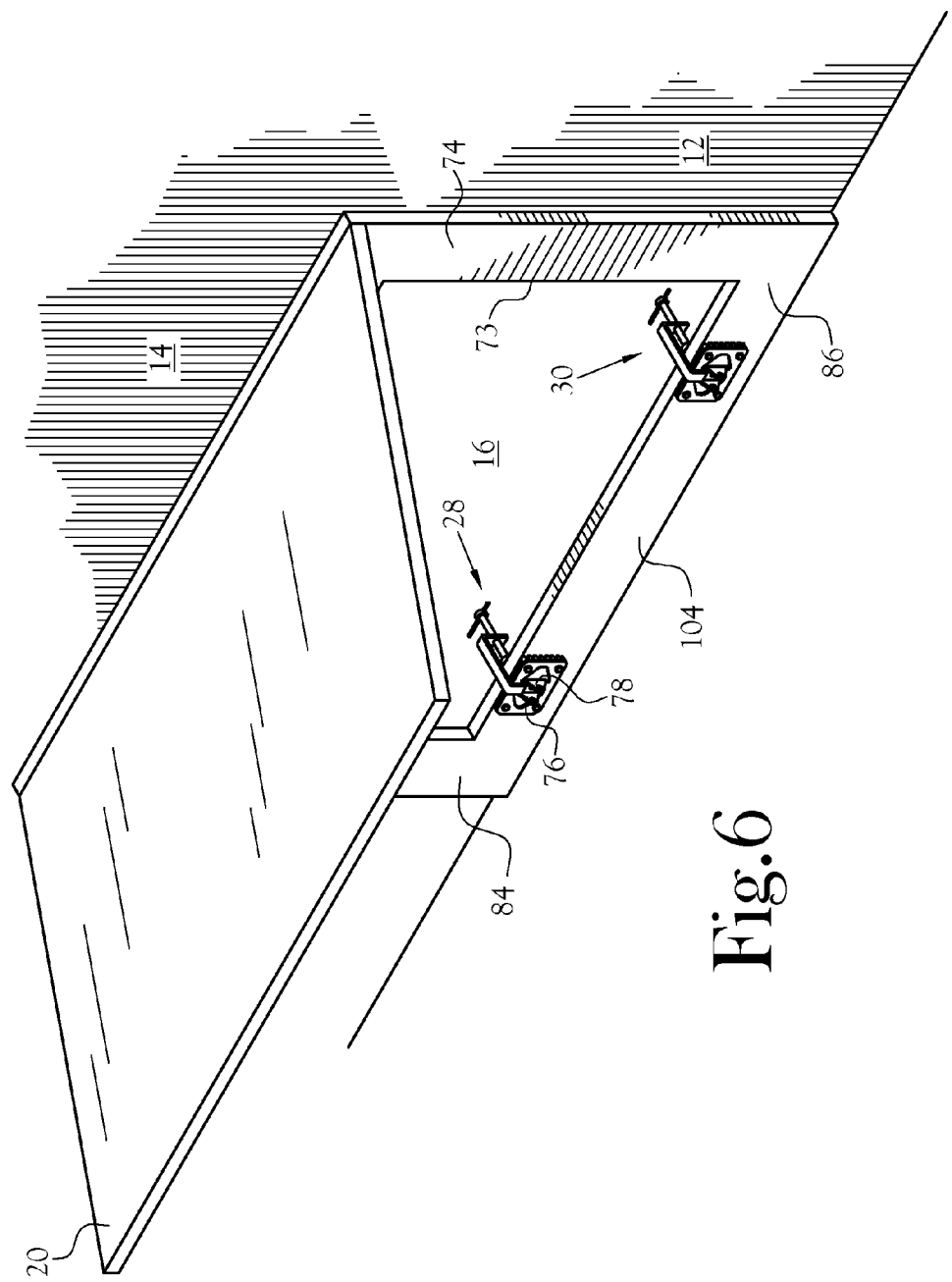
FIG. 6 is a representation of one embodiment of the present invention depicting multiple door frame clamps mounted on a door frame of an external storage compartment of a recreation vehicle.
Figure 9:
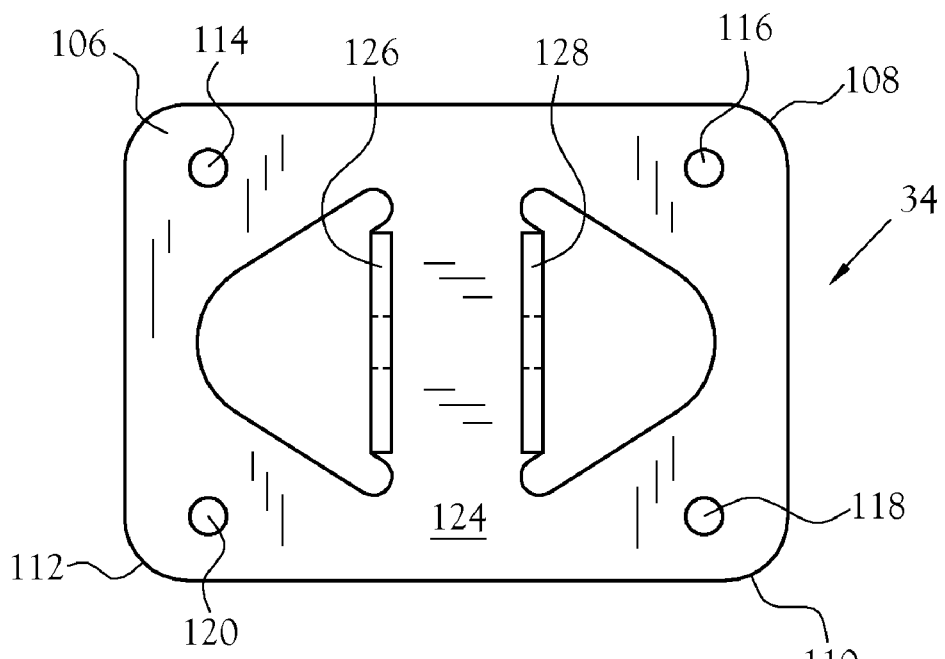
FIG. 9 is a top plan view of one embodiment of a door plate component of the present invention.
Figure 10:
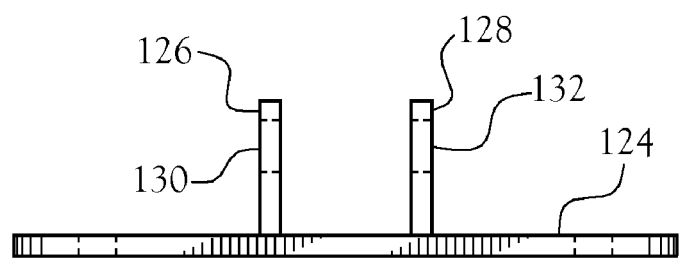
FIG. 10 is an end plan view of the door plate depicted in FIG. 9.
Figure 13:
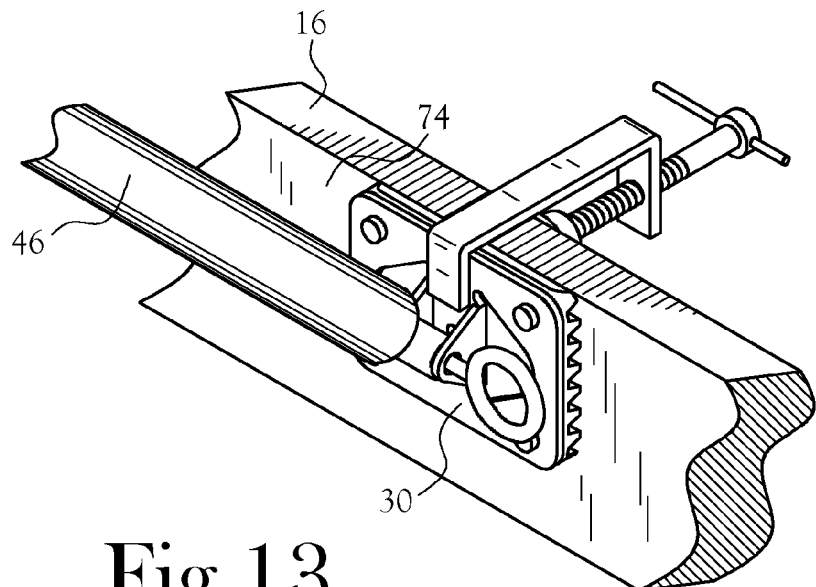
FIG. 13 is a representation of one embodiment of a door frame clamp and a positioning stanchion of the present invention as deployed with a single door adapted to close an external storage compartment for a recreation vehicle.

The inboard end 72 of the screw member includes a cap 67 and/or cap cover adapted to engage and apply pressure to that portion of the perimeter of the door frame 74 with which the door frame clamp is associated when the frame is disposed between the ribbed inner surface 52 of the clamp and the cap 67 of the cap screw. When mounted on the frame 74 of storage compartment door 20 of a recreation vehicle, each door frame clamp provides for good frictional engagement of the clamp with a location on the door frame of the storage compartment of the recreation vehicle. When the door frame clamp is properly installed, the mounting lugs 76,78 of the door frame clamp project outwardly from the frame to accept one end of a stanchion 44 therebetween (FIGS. 6 and 7).

The outer surface 54 of the body portion of each door frame clamp is provided with first and second upstanding mounting lugs 80 and 82, respectively, each of which includes a throughbore 84 and 86, respectively, passing perpendicularly through a respective mounting lug. As depicted, these lugs may be planar and parallel to one another with their respective throughbores in register. As noted, the first and second door frame clamps are essentially identical, one each of which is adapted to be mounted on the door frame adjacent the opposite bottom corners 85 and 86 in like manner or internally of the storage compartment proximate the door frame.

Figure 4:
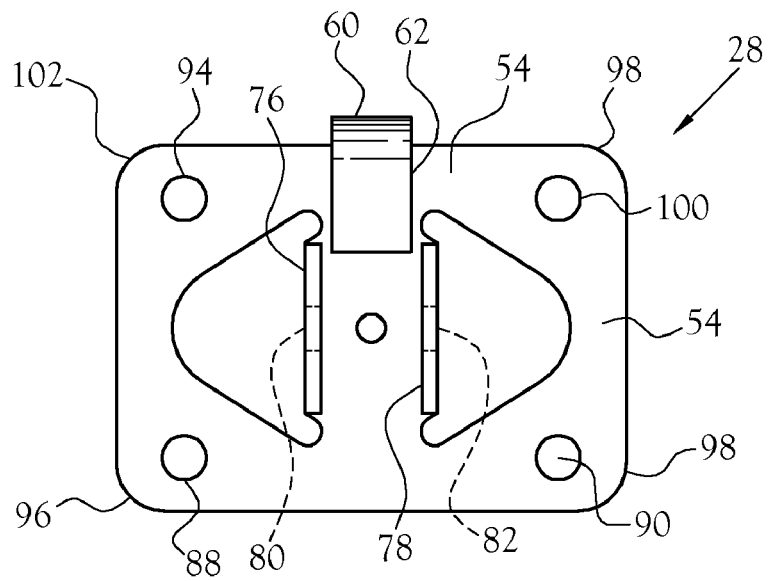
FIG. 4 is a bottom plan view of the door frame clamp depicted in FIG. 3.

In one embodiment, as depicted in FIG. 4, the planar body portion of the door frame clamp, optionally, may be provided with throughbores 88-94 located proximate the four corners 96-102 of the body portion. As needed, or desired, screws or like fasteners, may be deployed within these throughbores and into the door frame to enhance the retention of the door frame clamp in its desired position on the door frame for the storage compartment of the vehicle or to provide the sole means of attachment of the door frame plates to the recreation vehicle.

Alternatively, one or both of the door frame plates may be anchored at a location internally of the storage compartment, such as a location on the floor of the storage compartment which is proximate the door frame. In this embodiment, the mounting of the door frame plates may be carried out employing screws or like fasteners passing through the throughbores adjacent the four corners of the plates in lieu of using the cap screw subassembly for establishing rigid attachment of the door frame clamp to the recreation vehicle. In a still further embodiment, each of the door frame plates may be substantially permanently mounted in their respective locations relative to the entry opening into the storage compartment by means of a "double-backed" adhesive pad positioned between the first surface of the plate and a chosen location relative to the storage compartment. Commonly, when such adhesive pads are employed, the door frame clamps are not removed between uses of the door in its table mode as established employing the present invention. As desired, suitable screws or like fasteners may be included within a kit of the present invention. In one embodiment of the kit of the present invention, there are included within the kit multiple "double-backed" peel-off adhesive pads to increase the universality of the kit.

In use, as seen in FIGS. 6, 7 and 8, a door frame clamp is positioned in a desired and convenient location on the door frame of the storage compartment. This location commonly is on the bottom edge 104 of the door frame and proximate one of the bottom corners 84, 86 of the frame as seen in FIG. 6. Commonly two door frame clamps per each door are employed, each clamp being proximate a respective one of the opposite bottom corners of the door frame as seen in FIGS. 6 and 8. When so mounted, the mounting lugs thereof are exposed to receive therebetween one end 43 of a stanchion 44. As noted, other suitable locations of the door frame plates may be employed without departing from the spirit or scope of the present invention.

In the depicted embodiment of the present invention, there are provided first and second door plates 34 and 36, respectively, each being adapted to be mounted on the inside surface 52 of the door for a storage compartment of a recreation vehicle. To this end, the door plate is of a substantially flat planar rectangular geometry. In the depicted embodiment, proximate each of the four corners 106-112 of the door plate there are provided throughbores 114-120 adapted to receive screws or like fasteners therethrough and into the inner surface 122 of the door to rigidly mount each door plate on the door.

The door plate includes an inner surface 124 provided with first and second upstanding first and second lugs 126, 128. As depicted, these lugs are planar and parallel to one another and each includes a respective throughbore 130, 132 through its thickness. These throughbores are in register for the receipt therebetween of an end 43 of a stanchion 44. A quick release pin 42 is insertable within the registered throughbores to releaseably and hingedly interconnect the lugs with the stanchion.

Alternatively, each of the door plates may be mounted to the inner surface of the door employing "double-backed" adhesive pads as referred to hereinabove.

Interconnection of each door frame clamp to a companion door plate may be effected by means of an elongated stanchion having opposite ends adapted to be mounted between the respective lugs of companion ones of a door frame clamp and a door plate. Adjustability of the length of each stanchion is desirable. In the depicted embodiment of a stanchion useful in the present invention, there are provided multiple adjustment features. A first feature provides for the stanchion to be in two elongated members 134, 136, one member 134 being adapted to be telescopically received within the other 136 of the two members. In this embodiment, the outer member is provided with a plurality of spaced apart aligned holes (detents) 138 (typical) through its thickness along the length of the outer member. The inner member 134 is provided with at least one spring-loaded rounded catch (e.g. a ball bearing) 139 which is at least partially receiveable within respective ones of the detent holes along the length of the outer member 136 to lock the telescoping members together at selectable overall lengths of the stanchion.

Further, in the depicted embodiment, the outboard end 140 of each elongated inner member 134 of a stanchion is provided with a fitment 142 whose inboard end 144 is threaded and adapted to be threadably received within internal threads 145 in the outboard end of its companion inner member of the stanchion. In like manner, the outboard end of the second telescoping member of the stanchion is provided with a fitment having an outboard end which is threaded and received within the internally threaded open end of the second member. The outboard end of each fitment 146 carries a throughbore 148 which, when in register with the throughbores of a respective set of mounting lugs on a clamp or plate, may be releasably joined with the lugs as by a quick release pin or like fastener. Desirably, the threads associated with the two fitments of each stanchion are of reversed directional threads so that rotation of the second member of the stanchion about its longitudinal centerline while the fitments are held non-rotatable, in a first direction effects shortening of the overall length of the stanchion and rotation of the second member in the opposite direction effects lengthening of the overall length of the stanchion.

From the foregoing, it will be recognized that a door frame plate, a door plate and a stanchion define a subassembly. By means of the dual length-adjustment features of each stanchion this subassembly provides for length adjustment of the stanchion as needed to establish horizontal and planar positioning of the upraised door of the storage compartment. When so positioned, the outer surface of the door becomes the upper surface of a rigid table. As seen in the several Figs. the upraised door projects outwardly from the recreation vehicle to provide substantial flat area for receiving thereon one or more of items. For example, the present invention provides for positioning of the plane of the door within a range of angles of from between about 15 and about 120 degrees from the vertical (as measured from the vertical closed position of the door). This adjustability permits the table to be established at that angle which is most beneficial for the task at hand. For example, at an angle of about 90 degrees, the table is oriented substantially in a horizontal plane and can serve as a shelf or the like for various items. By positioning of the table at an angle of about 30 degrees, the table may be oriented to receive thereon a set of architecual drawings for ready viewed of the drawings.

Desirably, there is provided a door frame clamp/door plate/stanchion/quick release pins combination proximate the opposite bottom corners of the door frame and the inner surface of an associated bottom corner of the door for the storage compartment, thereby permitting the leveling of the upraised door to a desired plane. This leveling may be to a substantially true horizontal position, or if required due to the non-horizontal resting position of the recreation vehicle (such as lateral tipping of the vehicle due to the vehicle resting on an inclined plane), the stanchions may be adjusted to accommodate such non-horizontal alignment of the recreation vehicle.

Figure 5:
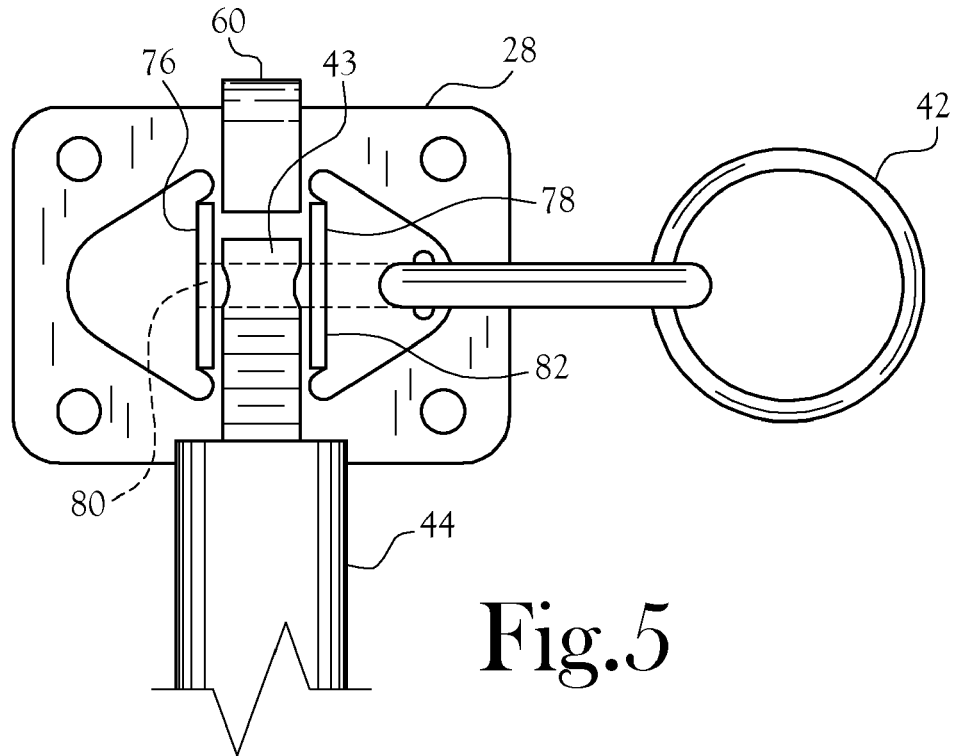
FIG. 5 is a further bottom plan view of the door frame clamp depicted in FIG. 3.
Figure 14:
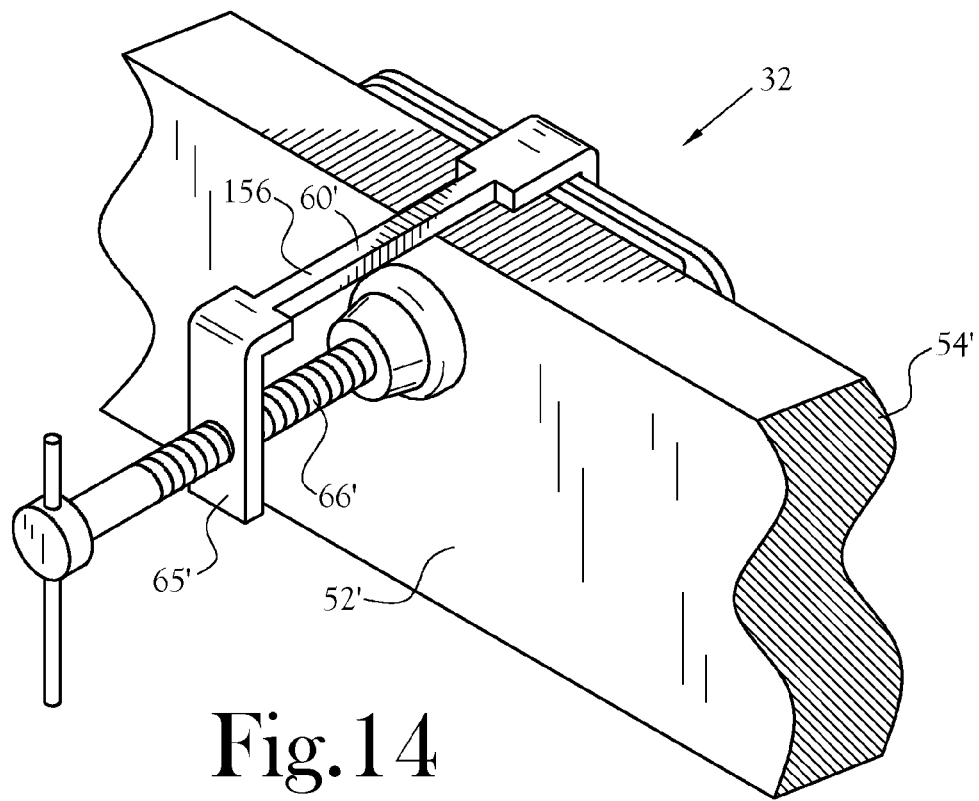
FIG. 14 is a representation of one embodiment of a multiple-door clamp embodying various aspects of the present invention.
Figure 15:
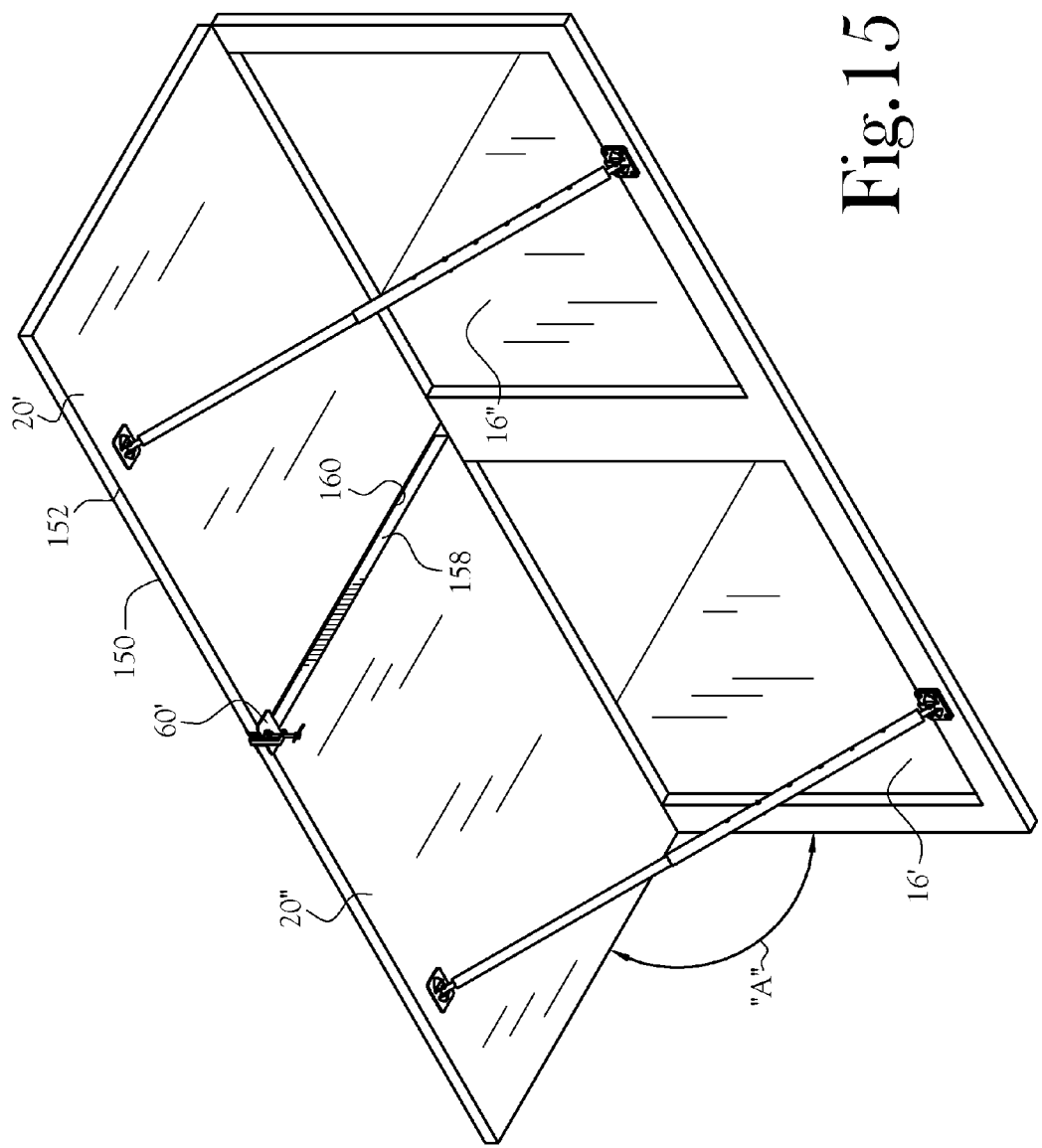
FIG. 15 is a representation of one embodiment of the present invention as deployed with double-doors adapted to close an external storage compartment of a recreation vehicle.
Figure 16:
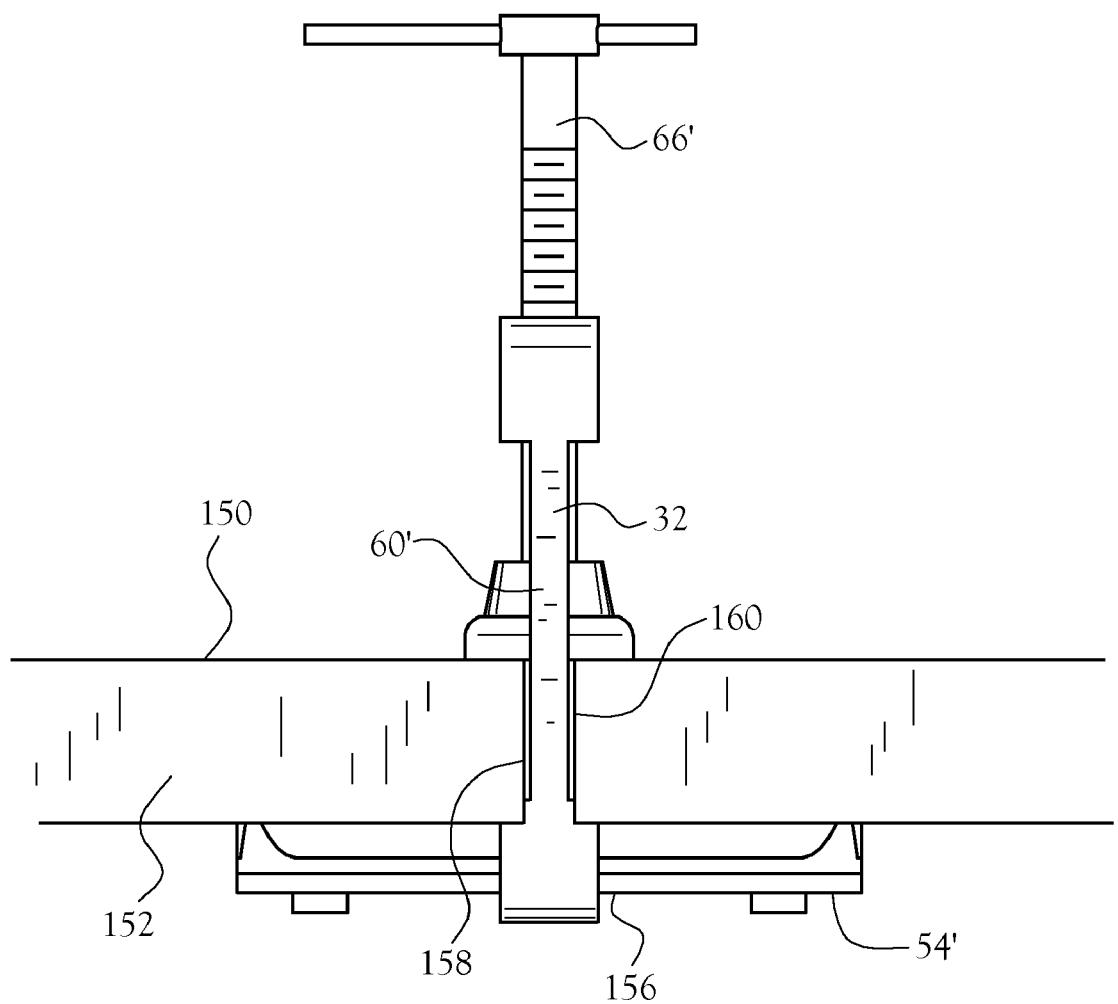
FIG. 16 is a representation of a multiple-door clamp as depicted in FIG. 14 as deployed between adjacent doors.
Figure 19:
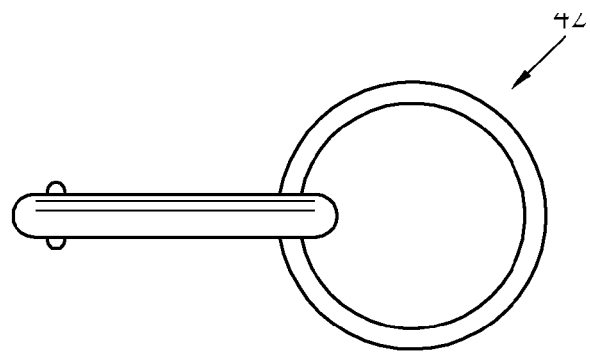
FIG. 19 is a representation of a quick release pin suitable for use in the present invention; and, FIG. 20 is a representation of a storage bag suitable for containment of the components of the kit of the present invention.
Figure 20:
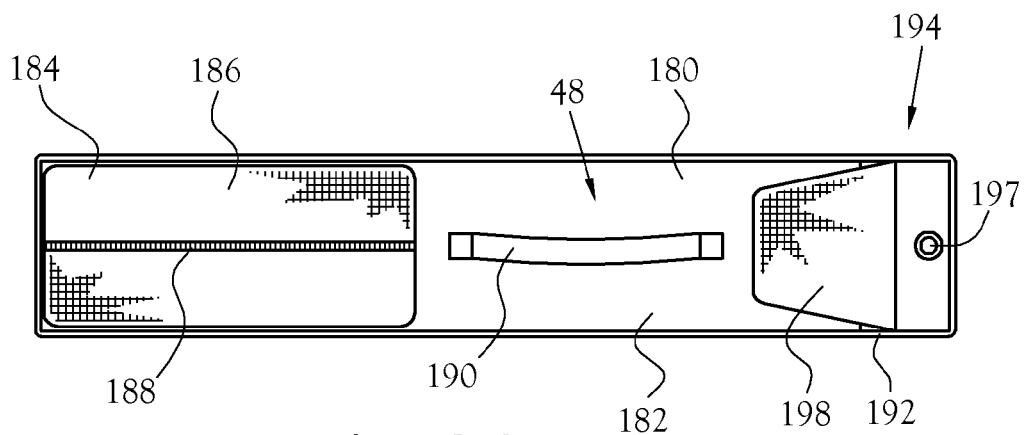
Figure 21:
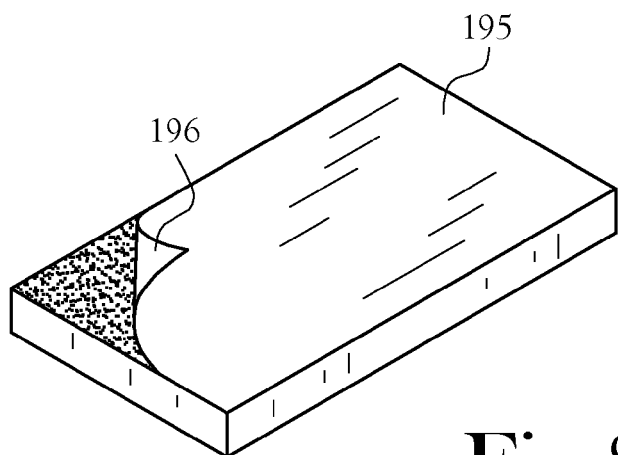
FIG. 21 is a representation of one embodiment of a "double-sided" adhesive pad useful for affixing door plates and/or door lock plates to their respective mounting locations.

Referring to FIGS. 14-16 (in which like components of the one-door embodiment and a two-door embodiment are identified using primed numerals), in one embodiment of the present invention, two independently operable doors 20', 20" of adjacent, but separate, storage compartments 16',16" may be converted into a single table. In this embodiment, the present invention includes a multiple-door clamp 32' such as depicted in FIG. 14. This multiple-door clamp is substantially like the door frame clamp 28 depicted in FIGS. 3-5 except the bracket 60' leading from the outer surface 54' of the clamp 32' and overhanging the outer surface of the clamp is of a lesser width, at least in that portion 156 of the bracket 60' which resides between the inner surface 52' of the body portion of the clamp and the overhanging outboard end 65' portion of the bracket. This lesser width permits the cap screw 66' and the lesser width of the bracket to pass into and reside between adjacent side edges 158, 160 of adjacent doors of adjacent storage compartments and thereby in position to clamp such adjacent side edges to one another such that the adjacent doors function as a single unit, i.e. as a single table. Each of the multiple doors is provided with its own door frame clamp/door plate/stanchion subassembly. In a "two-door" situation, however, one such subassembly is mounted generally centrally of the length of each door to provide substantially evenly divided support for the two doors. Otherwise, each of the frame clamp/door clamp/stanchion subassemblies employed with the two-door table function as described hereinabove in connection with a single door. As desired additional such subassemblies may be employed to enhance the rigidity of the adjacent doors as and after they have been converted to a table as described hereinabove. It is noted that in the two-door embodiment, the positioning of the multiple-door clamp between the adjacent edges of the two doors involved, these two doors function as a single door so that only two stanchions need be employed in this combination and held together by the multiple-door clamp. As desired, the innermost door plate may be mounted in spanning relationship to the adjacent edges of the multiple doors thereby enhancing the rigidity of the two doors relative to one another . . . .

The kit of the present invention is universal in that it can be employed to convert a storage compartment door to a table irrespective of the geometry of the perimeter of the door. Likewise, the conversion is substantially independent of the make and model of the recreation vehicle or the horizontal hinging of the door or doors.

Further, in one embodiment of the present invention, there is provided a lock plate 38 (FIGS. 17, 18) having a depression 163 which opens outwardly of an inner surface 162 of the plate which faces the compartment door when installed. In those instances where the door of the storage compartment includes a lock which protrudes outwardly from the inner surface of the door, if the lock can be removed, the lock plate is provided with throughbores 164-170 at its opposite corners 172-178 which permit the lock plate to be substituted for the lock cover on a temporary basis, thereby covering the opening formerly occupied by the lock. If after the lock cover has been removed, the lock protrudes somewhat outwardly from the surface of the door, such as in electric locks, the protruding portion of the lock merely may be disposed within the depression 163 in the lock plate and the lock plate screwed to the door to cover the lock. Optionally, the kit of the present invention may be provided with a plurality of elastomeric or metallic washers suitable to serve as spacers between the surface of the door and the lock plate, thereby providing additional spacing between the lock plate and any underlying portion of the electric lock. In those instances where it is either undesirable or unwise to partially dismantle or remove the electric lock, the lock plate may be affixed to the inner surface of one of the doors at a location adjacent, but spaced apart from, the lock, employing a "double-sided" adhesive pad as described hereinabove.

For storage and transport purposes, the multiple components of the present invention may be housed within an elongated fabric bag 48 in accordance with one aspect of the present invention. The depicted bag includes first and second elongated side pockets 180, 182, each of which is adapted to receive therein one of the stanchions of the present invention. Adjacent one end 184 of the elongated bag, there is provided a side pocket 186 which is zipper-closable 188 and which is adapted to contain all of the components of the present invention other than the stanchions. A handle member 190 may be provided on the exterior of the bag at a convenient location which offers ease of lifting and carrying a loaded bag. For marketing purposes, it is desirable that the top end of the bag be provided with a grommet or the like suitable for hanging the bag for display in a retail outlet or the like. Further, as desired, the top end of the bag may be overwrapped by a label which provides space for advertising information.

Whereas for descriptive purposes, the present invention has been defined in combination with a frame circumscribing a door of an externally accessible storage compartment of a recreation vehicle, it will be recognized that the door frame clamps may be affixed to some rigid element of the storage compartment (or even a rigid element of the recreation vehicle which is proximate the storage compartment). Similarly, whereas herein reference is made to a quick release pin useful in interconnecting respective ends of a stanchion to the mounting lugs of a door frame plate and a door plate, for example, it will be recognized that other quick release fasteners may be employed to provide such interconnection of the stanchions and the plates, for example toggle clamps. Further, as noted, each of the door frame plates, the door plates and/or the door lock plates may be affixed to their respective mounting locations by means of "double-sided" adhesive pads formed from rubber or like material in lieu of the use of screws, for example or clamps. It will thus be recognized that the kit of the present invention should include at least the basic components comprising at least one door frame clamp, at least one door plate, and at least one stanchion. Others of the components described herein may be optionally placed in the kit, and in some instances are preferred. To render the kit more universal in its applicability to differing recreation vehicles having differing storage compartments and/or compartment doors, it is preferred that the kit include, in addition to the essential components noted above, multiple ones of various of the components, plus other components such as multiple lock plates, at least one two-door door clamp, multiple quick release pins or their equivalents, multiple screws or like fasteners, multiple "double-sided" adhesive pads, and multiple spacer washers, for example.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed:

1. Apparatus for conversion of a horizontally hinged door of an externally accessible storage compartment of a recreation vehicle to a table capable of being oriented at an angle of between about 15 and about 120 degrees with respect to the vertical, said compartment being circumscribed by a door frame or similar fixed aspect of the vehicle, comprising at least one door frame clamp adapted to be affixed to the door frame or similar fixed aspect of the vehicle, said door frame clamp including a planar body portion having an inner surface and an outer surface, a cap screw, and a mounting bracket fixedly positioning said cap screw in position relative to said inner surface of said body portion of said door frame clamp to engage and apply clamping pressure to said door frame or similar fixed aspect of the vehicle, said door frame clamp further including first and second generally planar spaced apart and substantially parallel mounting lugs upstanding from said outer surface of said body portion of said door frame clamp, each including a throughbore through the thickness thereof, said throughbores of said first and second mounting lugs being in register with one another, at least one door plate having an inner surface and an outer surface adapted to be affixed to the inner surface of a door of the storage compartment with said inner surface thereof facing the door, said door plate including first and second generally planar spaced apart and substantially parallel mounting lugs upstanding from said outer surface of said door plate, each including a throughbore through the thickness thereof, said throughbores of said first and second mounting lugs being in register with one another, at least one stanchion having a first end interconnectable to said mounting lugs of said door frame clamp and a second end interconnectable to said mounting lugs of said door plate, and a quick release member adapted to releasably secure each of said interconnections of said stanchion and said plates.

2. The apparatus of claim 1 and including a multiple-door clamp adapted to interlock together adjacent side edges of two doors, said multiple-door clamp being of substantially like construction and function as said door frame clamp.

3. The apparatus of claim 1 and including a flexible elongated, multiple-compartmentalized, fabric carrier adapted to receive said apparatus for storage and transport.

* * * * *